United States Patent [19]

Carter et al.

[11] Patent Number: 4,488,287

[45] Date of Patent: Dec. 11, 1984

[54] COMBINING AND SPLITTING OF VOICE AND DATA FROM MULTIPLE TERMINAL SOURCES AND ELECTRONIC PABX FOR SAME

[75] Inventors: Nicholas J. R. Carter, Shelton; Francisco A. Middleton, Sandy Hook; Santanu Das, Shelton, all of Conn.

[73] Assignee: International Telephone and Telegraph Corporation, New York, N.Y.

[21] Appl. No.: 445,626

[22] Filed: Nov. 30, 1982

[51] Int. Cl.³ .............................................. H04Q 11/04
[52] U.S. Cl. .................................... 370/58; 179/2 DP
[58] Field of Search ......................... 370/85, 58, 110.1; 179/2 DP

[56] References Cited

U.S. PATENT DOCUMENTS

| 3,790,715 | 2/1974 | Inose et al. | 370/110.1 |
| 3,889,063 | 6/1975 | Slavin | 370/85 |
| 4,381,427 | 4/1983 | Cheal et al. | 370/110.1 |
| 4,394,757 | 7/1983 | Muzumdar et al. | 370/110.1 |
| 4,402,073 | 8/1983 | Hammond | 370/85 |
| 4,403,322 | 9/1983 | Kato et al. | 370/110.1 |

Primary Examiner—Douglas W. Olms
Assistant Examiner—Wellington Chin
Attorney, Agent, or Firm—John T. O'Halloran; Jeffrey P. Morris

[57] ABSTRACT

The present invention discloses a data partitioning technique wherein the PCM speech transmission data field is utilized to contain both digitized speech (for example, from a telephone) and other data (for example, from a data terminal) in the same channel within a frame having a plurality of channels e.g. 32 channels, of information. This enables the speech and data to be combined in a common information field and simultaneously transmitted in the same channel, frame by frame, through a digital switching network to other system users. Also, in accordance with the present invention, system users can individually selectively access a data base system through the switching network, such that the same information can be broadcast from the database system to a plurality of system users, or such that different information can be accessed in the database system by a plurality of system users and simultaneously transmitted to different users in different channels. A novel technique for transmitting information from the database system via a telecommunication systems tone bus interconnecting the system is described.

38 Claims, 11 Drawing Figures

COMBINING AND SPLITTING OF VOICE AND DATA FROM MULTIPLE TERMINAL SOURCES AND ELECTRONIC PABX FOR SAME

CROSS REFERENCE TO RELATED APPLICATIONS

Frank A. Middleton, Ser. No. 433,335, filed Oct. 17, 1982, "Handling of Multiple Subscriber Terminations Simultaneously by Use of a Phanton Multiplexing Technique on Two Pairs of Wires."

F. A. Middleton et al, Ser. No. 445,625, filed on Nov. 30, 1982 and now abandoned, entitled "Voice and Data Switching In Electronic Private Automatic Branch Exchange."

BACKGROUND OF THE INVENTION

1. Field of the Invention

The invention relates generally to the fields of digital data communications and telecommunications, and specifically to apparatus and method for simultaneously transmitting speech and data in the same communications channel between two or more terminals, each of which terminals includes a voice and data capability, such as a telephone and data terminal. The invention is particularly applicable to Electronic Private Automatic Branch Exchanges (EPABX) having voice and data capabilities, to office automation equipment telephone systems, engineering workstations, and intelligent terminals. Data may be used by end user terminals or for control and signalling between source and destination of the voice path.

2. Description of the Prior Art

Various PABX equipment is known in the prior art, representative of which are U.S. Pat. Nos. 3,943,297; 4,028,498 and 4,136,263. First generation EPABX equipment had stored program control, and used either electromechanical switching networks, such as Xbar or reed relay; or electronic analog networks. These systems provided greater capabilities than those of a standard telephone set by activation of special codes which were deciphered by the system.

The second generation EPABX of the prior art uses digital switching networks configured either as time-space-time (TST) or space-time-space (STS), resulted in substantial size reduction. Examples of such second generation EPABX equipment are ROLM CBX and Wescon digital PABX.

Telephone instruments are evolving toward multifunction devices providing both speech communication and data transmission requirements from, in effect, a digital data interface. Thus, the telephone set effectively is evolving toward the digital data interface and the EPABX to a digital data switching network as well as the standard voice network. It is therefore necessary to transmit digitized speech and data through a digital switching network. A digital switching network able to switch digitized speech and data through the network is described in U.S. Pat. No. 4,201,891 entitled Expandable Digital Switching Network, of A. Lawrence et al and is assigned to the assignee of the present invention. Another example of a switching system for voice and data is U.S. Pat. No. 4,317,962 of J. Cox et al, also assigned to the assignee of the present invention. The present invention, which may be considered to be third generation EPABX technology, is capable of providing simultaneous transmission of speech and data in the same PCM channel, and is particurlarly advantageously utilized in combination with digital switching networks such as that of aforementioned U.S. Pat. No. 4,201,891 wherein digitized speech and data are transmitted in the same PCM channels. However, in U.S. Pat. No. 4,201,891 the digitized speech and data are transmitted sequentially, whereas in the present invention, the digitized speech and data are transmitted simultaneously, e.g. within the channel times of each frame.

SUMMARY OF THE INVENTION

The present invention discloses a data partitioning technique wherein the PCM speech transmission data field is utilized to contain both digitized speech (for example, from a telephone) and other data (for example, from a data terminal) in the same channel within a frame having a plurality of channels e.g. 32 channels, of information. This enables the speech and data to be combined in a common information field and simultaneously transmitted in the same channel, frame by frame, through a digital switching network to other system users. Also, in accordance with the present invention, system users can individually selectively access a data base system through the switching network, such that the same information can be broadcast from the database system to a plurality of system users, or such that different information can be accessed in the database system by a plurality of system users and simultaneously transmitted to different users in different channels. A novel technique for transmitting information from the database system via a telecommunication systems tone bus interconnecting the system is described.

To provide the capability of simultaneous speech and data switched to the same subscriber by a digital switching system such as that described by the aforementioned U.S. Pat. No. 4,201,891 it has been discovered that the spare five bits of the 16-bits PCM words per channel may be dedicated to data transmission with one bit taking two frames to transmit. The 5-bit and 8-bit information fields are not separated, but the complete channel is transmitted to both data and speech destinations. The destination equipment, a data terminal or key telephone set, etc. then separates out the information field it requires. Alternatively, the data and speech fields may be separated in the PABX and transmitted/received from the data terminals and telephone sets independently. A system in accordance with the present invention combines the 5-bit and 8-bit data and speech information fields into one channel, thereby enabling the two fields to be transmitted simultaneously to a destination such as a key telephone subscriber with a digital telephone. Of course, when such a terminal does not require/permit simultaneous communication of speech and data; it may be used to communicate with other data terminals, using data in the speech path as the transmission medium, with modems as is currently done in the prior art. This does not preclude the additional sending of 5-bit data if desired.

By way of example, a four wire termination to a digital telephone can provide a transmission path for 8-bits of digitized speech and 5-bits of data. Speech and data originating at one terminal can be switched via a digital switching network to two or more destinations independently combined in a 16-word PCM channel. At a digital interface, speech and data bits mapped from two separate network PCM channels can be extracted for sending to a single digital telephone.

Data can be switched to terminals from a data source via the telephone tone bus. The tone bus provides for example approximately 20 free channels for high speed (64K bit/second) transmission of large amounts of data using the speech path, and 5-bits per channel per frame can be used to provide a 32K bit/second serial path for up to thirty terminals concurrently, independent of the use of the speech paths.

It is, therefore, a primary object of the present invention to provide simultaneous transmission of voice and data in the same channel between one or more end user terminations.

It is another object of the present invention to provide simultaneous in-channel voice and data communication between a plurality of system users.

It is another object of the present invention to provide simultaneous in-channel voice and data communication between one or more system users and a database system.

It is another object of the present invention to provide for a plurality of system users to simultaneously transmit or receive speech and data selectively to each other individually or in a broadcast mode, and to simultaneously access a database system such that each system user can receive the same or different data from the database system, simultaneously over the system tone bus together with one or more other system users.

The foregoing and other features and advantages of the invention will become apparent with reference to the following detailed description thereof taken in conjunction with the accompanying drawings, wherein:

DESCRIPTION OF THE PREFERRED EMBODIMENT

Figure 1:
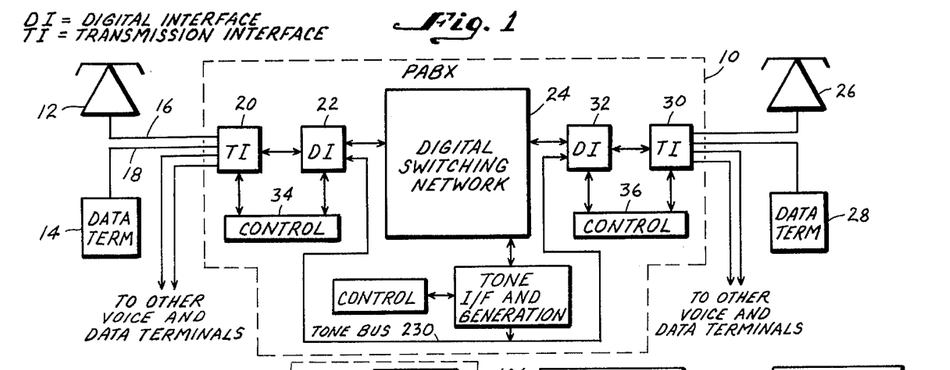
FIG. 1 is a generalized block diagram illustrative of a PABX incorporating provision for the simultaneous full duplex transmission of voice and data to two-port system users.

Referring to FIG. 1, the simultaneous transmission of voice and data in a two-port communication system is illustrated. Voice and data are coupled to a Private Automatic Branch Exchange (PABX) 10 from a plurality of voice and data terminals, one of which voice terminals is illustratively shown as telephone subscriber set 12 and one of which data terminals is illustratively shown as data terminal 14.

Telephone subscriber set 12 and data terminal 14 are coupled via two-wire lines 16 and 18 to a transmission interface circuit 20 in PABX 10, which is adapted to receive both analog and digital information. Telephone subset 12 could comprise a telephone keyset, with keyset signalling being coupled over two wire pairs 16 and 18 in accordance with the phantom multiplexing technique described in copending U.S. patent application Ser. No. 433,335 of F. Middleton, which is assigned to the same assignee as the present invention.

The transmission interface 20 may be comprised of a telephone line circuit, including a CODEC and BORSCHT circuits of known design, such as are described for example by U.S. Pat. Nos. 4,161,633 of R. Treiber; 4,317,963 of R. Chea; 4,270,027 of B. P. Agrawal et al; and 4,272,648 of B. P. Agrawal et al, which are representative of various telephone line circuits for interfacing analog and/or digital transmission inputs to a digital line which are all assigned to the assignee of the present invention and to which reference may be made for details of a suitable transmission interface.

Digital data from terminal 14 on line 18 is comprised of, for example, 8-bit data words encoded in standard HDB-3-code in conventional manner. The data is arranged to obtain positive and negative pulses and also to enable recovery of a clock. A conventional RS-232 modem for a computer terminal interface may be alternately used for this purpose, being utilized at each end of the line 18.

Digitized voice and digital data are coupled to a digital interface circuit 22 to provide a full duplex communication link between digital interface 22 and a digital switching network 24, with half duplex links provided between transmission interface 20 and data terminal 14 and subscriber set 12. Alternatively, full duplex transmission may be provided in a known manner to PABX 10 by well known ping-pong or echo cancelling techniques or by 4-wire lines. Digital Switching Network 24 preferably comprises a distributed control switching network, the details of which are described by U.S. Pat. No. 4,201,889. Digital Switching Network 24 couples frames of channels of digitally encoded data and digitized speech from any desired subscriber or data terminal to any other desired telephone subscriber or data teminal. FIG. 1 representatively shows the interconnection of subscriber 12 and data terminal 14 to subscriber 26 and data terminal 28 via switching network 24. Terminal interface 30 and digital interface 32 function in identical manner as do terminal interface 20 and digital interface 22. Control circuitry 34 and 36, as described hereinafter and in referenced U.S. Pat. No. 4,201,889, functions to establish and maintain transmission paths within the switching network 24. Control circuitry 34 and 36 also contains processing capability to handle protocols between the digital interfaces 22 and 32 respectively to subscriber sets and data terminals. Control circuit 34, for example, may comprise an Intel 8086 microprocessor for use for example in detection of OFF HOOK signalling and in applying ringing tones such as is described in U.S. Pat. No. 4,349,703 of R. Chea assigned to the assignee of the present invention.

Figure 2:
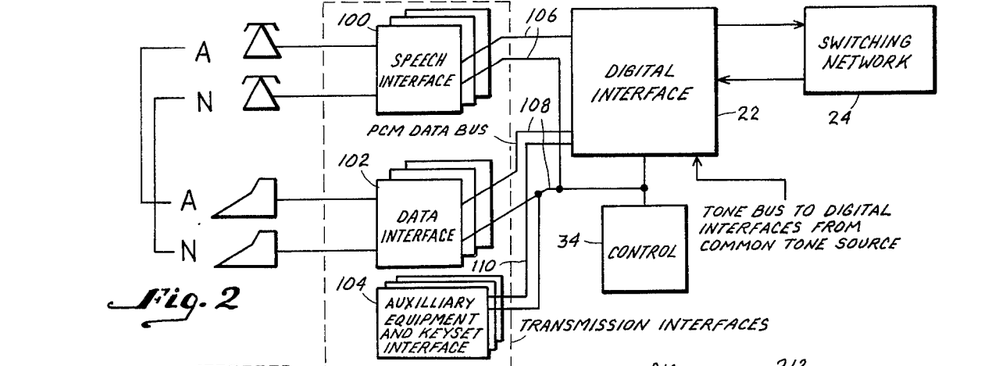
FIG. 2 is a generalized block diagram of the system of FIG. 1 adapted for use by a plurality of two-port system users.

Referring now to FIG. 2, a simplified block diagram of the interconnection of a plurality of speech and data terminals to the PABX arrangement of FIG. 1 is illustrated. Telephone subscriber sets 1 thru N are coupled to analog speech interface 100 portion of the transmission interface 20. Data terminals 1 thru N are coupled to the data interface 102 of transmission 20. Auxiliary equipment 104 common to telephone line circuits as aforementioned is also included herein, for example ringing signal generation as described in the aforementioned U.S. Pat. No. 4,349,703, also interfaces to key set for control/data exchange with control 34. While only one plane of the transmission interfaces 20 is shown, it is understood that multiple identical planes are utilized in a PABX, and the use of such multiple planes in a switching network is well known and described in the aforementioned U.S. Pat. No. 4,201,891. Pulse Code Modulated (PCM) speech and data busses, shown illustratively at 106, 108 and 110 respectively, are bidirectional in that each bus includes a pair of unidirectional transmission paths, each being dedicated to one direction of data flow. Each unidirectional transmission path of 106, 108 and 110 carries, for example, thirty-two channels of digital information, time division multiplexed (TDM) in bitserial format. Each frame of TDM format is comprised of the thirty-two channels with each channel having, for example, 16-bits of information at a bit transmission rate of 4.096 Mb/s. PCM speech and data busses 106 and 108 respectively are coupled to digital interface circuit 22 wherein speech and data are combined as hereinafter described for simultaneous transmission through the switching network 24. The keyset interfaces are coupled to the digital interface by the transmission path 110. As aforementioned, control processors 34 and 36 function to perform path set-up through the network 24.

Figure 3:
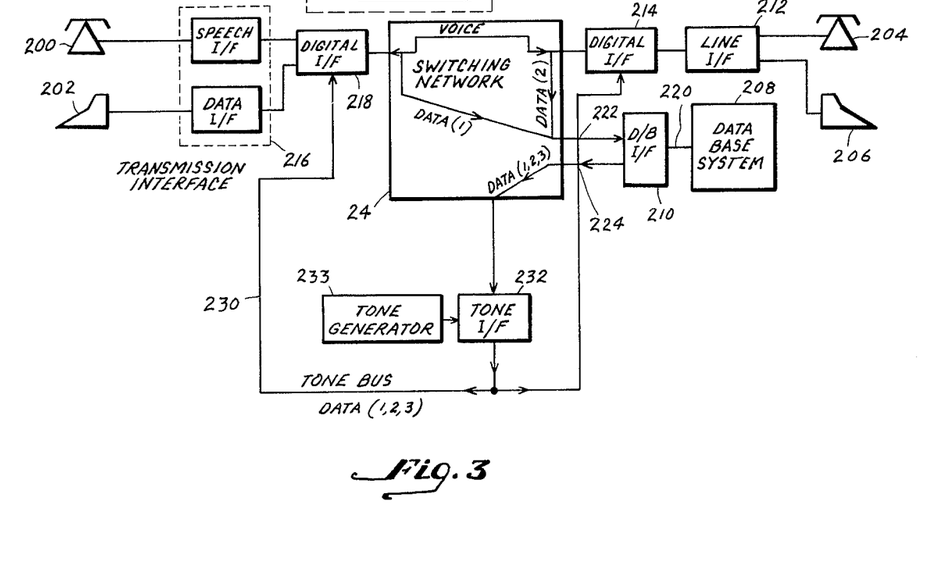
FIG. 3 is a generalized block diagram of the system of FIGS. 1 and 2 expanded to a three-port system providing voice and data transmission and access to a database system.

Referring now to FIG. 3, a three-port system is illustrated wherein a voice or data system user at port-1 including subscriber set 200 and data terminal 202, can communicate selectively with either port-2 or port-3. Port-2 includes another voice and data system user at subscriber set 204 and data terminal 206. Port-3 includes a database system including a data processor 208 and a database interface at 210. Processor 208 may comprise any equipment, for example a stored program computer having data stored therein for retrieval by users at ports 1 and 2. Interface 210 functions to connect data streams directly to PCM channels, and includes a digital interface such as digital interface 22 in accordance with the present invention described hereinafter. Similarly, port-2 is connected through transmission interface 212 and digital interface 214 to switching network 24. Port-1 is connected to switching network 24 via transmission interface 216 and digital interface 218.

The three-port system of FIG. 3 is a full duplex system wherein both subscribers 200 and 204 have a simultaneous voice connection with common interaction via their respective data terminals 202 and 206 respectively with a database system 208. In accordance with a feature of the present invention, both subscribers 202 and 206 can (a) interact with a common database 208 such that they each get identical data returned from the database 208, even though each subscriber may transmit different data, or (b) get different data back at each subscriber from the database. Line 220 comprises a high speed parallel data bus. Digital interface 210 performs a serial/parallel conversion, channel allocation and synchronization for two-PCM links at 222 and 224 of, for example, 32 channels each.

The broadcasting of digital information from one port to multiple ports is known, and is described in detail by U.S. Pat. No. 4,293,946 of M. Kuras et al, assigned to the assignee of the present invention. FIG. 3 illustrates the transmission of data and digitized speech through network 24 between ports 1 and 2 and the database at port 3. Even though it is known to broadcast speech or data to multiple ports in the speech field, e.g. U.S. Pat. No. 4,293,946 of M. Kuras et al, the problem remains to combine data in the number of bits (5-bits, for example) of the data word being used. Thus one must be able to get digitized speech from port 1 to port 2, and data from port 1 to port 3. This is accomplished by broadcasting a single data word which contains both digitized speech and data in a combined information field to both destinations (port-2 and port-3). At the digital interface 214 of port-2, the speech only is retrieved and the data is ignored (discarded). At digital interface 210 of port-3, the data only is retrieved and the speech is ignored (discarded). Likewise, to transmit speech and data from port-2 to port-1 and port-3 respectively, the same technique is effectively used.

However, a problem arises in the prior art in getting data back from port-3 (the data base system) to both port-1 and port-2 and delivering it to the same terminals which are transmitting. The 16-bit PCM could be broadcast in a like manner to that described above, but it only uses 30% of the available bandwidth, and uses up another available speech channel at ports 1, 2. Thus, an additional broadcast and combination means is effectively required. It has been discovered that the already existing tone bus of a telephone PABX can effectively serve this purpose. Alternatively, a separate broadcast bus may be provided solely for this data purpose in addition to whatever tone distribution mechanism exists in the PABX even if such tone distribution mechanism is of a similar kind. The tone bus 230 may be, for example, a 32-channel PCM transmission link which runs between each digital interface 218 and 214 of each telephone subscriber port, such as port-1 and port-2. The conventional use of a tone bus in a telephone subscriber network is to switch audio tones such as ringing, busy signal, music-on-hold etc. so that a telephone subscriber hears the tones on the tone bus. Since each telephone subscriber is always connectable to the tone bus 230, i.e. each of the 32-channels on the tone bus can be coupled to each telephone subscriber, both subscribers at port-1 and port-2 can be connected to data transmitted in any one of the 32-channels from port-3. In the event that subscribers at port-1 and port-2 require different data from port-3, then data can simply be transmitted through the tone bus 230 in different channels of the 32 channel TDM PCM data frame. The tone interface is shown at 232 and the tone generator at 233. It is sufficient for an understanding of the present invention that tone generation and transmission circuitry is known in the prior art of telephony. A suitable tone bus configuration is shown with reference to FIG. 8. While the database interface circuitry 210 may be similar to the digital interfaces 214 and 218, it is to be understood that only the data insertion and extraction capability is required, hence digital interface 210 for the database system 208 could be comprised of any known data insertion and extraction circuitry.

Figure 4:
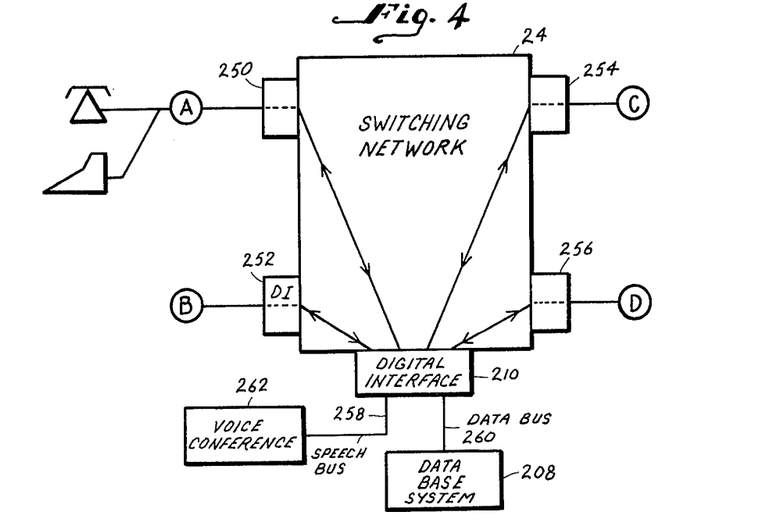
FIG. 4 is a generalized block diagram of four system users, each having voice and data capability and interconnected through a digital switching network to each other and to a database system.

Referring now to FIG. 4, a simplified block diagram illustrative of the connection of four individual system users A,B,C, and D, each having a voice (telephone) and data (terminal) capability to a database system 208 is shown. A plurality of channels in frames of PCM speech and data are switched through the digital switching network 24.

Speech and data from users A, B, C and D are combined at digital interfaces 250, 252, 254 and 256 respectively, into digital words representative of speech and data and are partitioned onto two busses 258 and 260 by digital interface 210. Bus 258 is a digitized speech bus and bus 260 is a data bus. Speech bus 258 connects users A, B, C and D to a conferencing circuit 262 to provide simultaneous voice connection to all users. The conferencing circuit may comprise, for example, the conferencing circuit described by the aforementioned U.S. Pat. No. 4,293,946 of M. Kuras et al. The data bus 260 simultaneously connects all users to the database system 208 to individually send or retrieve data therefrom. The retrieved data can be common data broadcast t some or all users or different data for each user. Database system 208 could be an Intel 8086 microcomputer or an IBM 370, depending upon the scale of data required by the users. The database system would typically have computing ability in addition to database access, to manipulate and compute data patterns or number representations.

Figure 5:
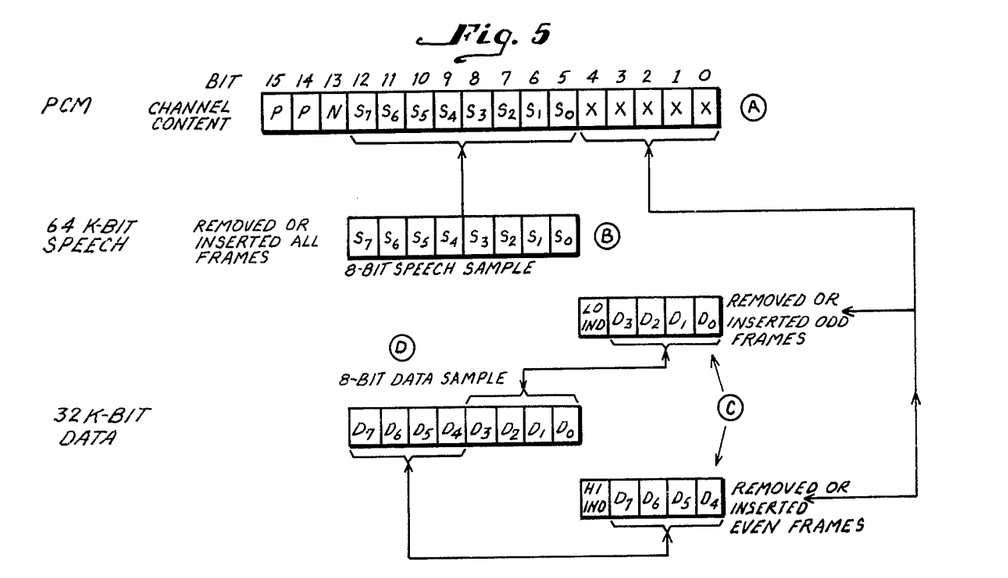
FIG. 5 illustrates a data format for combining digitized speech and data in the same channel for simultaneous transmission, in accordance with the present invention.

Referring now to FIG. 5, the data format utilized to provide simultaneous speech an data transmission in the block diagram of the igital interface illustrated by FIG. 6 will now be explained. Format A is the 16-bit data format used generally in telephony, and represents the PCM channel content of one of the 32 channels of a data frame. The bit designations are:

P = Protocol—2 bits
N = SPARE—1-bit
S = Speech—8-bits
X = Data—5-bits

It is to be understood that the protocol bits P in the system described may be a SPATA protocol such as "10" as described in the aforementioned U.S. Pat. No. 4,201,891 of A. Lawrence et al. The transmission rate is typically 4.096 M bit/s.

Format B is the 8-bit digital speech sample for the channel word in A. It is a digiral representation of an analog speech smaple. The 8-bit digital speech sample is either extracted or inserted in all frames of channels. The speech sample is removed or inserted when the interface to speech transmission interface from the digital interface is 8-bits×32 channels per frame. When PCM speech bus 106 of FIG. 2 has 16 bit words, then the speech samples do not need to be inserted or removed. However, the speech samples may more readily be inserted or removed on a per termination basis at the speech interface 100 such as described in aforementioned U.S. Pat. No. 4,201,891. The speech transmission rate is 64K bit/s, which is derived from 8K frames/s and 8 bits/channel per frame.

Format C illustrates two 5-bit data words which are alternately inserted into the data field (the X-bits) of the 16-bit PCM format A. Only the first 4-bits of the 5-bit data field are valid data. The additional bit is used to indicate which of the removed or inserted odd or even portions C of D is represented. The additional bit, either hi or low (1 or 0) is sometimes called a "nibble indicator", and each 4-bit data "nibble" from 8-bit data word D hs an opposite nibble indicator from each other, i.e. the nibble indicators are never both 0 or both 1.

Thus, the 5th bit in each nibble C is used for framing of the two 4-bit nibbles within the 8-bit data word D. The data word D has a transmission rate of 32K bit/s. For combined fields, the samples C are inserted for transmission—through the digital switching network. For separated fields, the samples C are extracted upon reception from the digital switching network.

Figure 6:
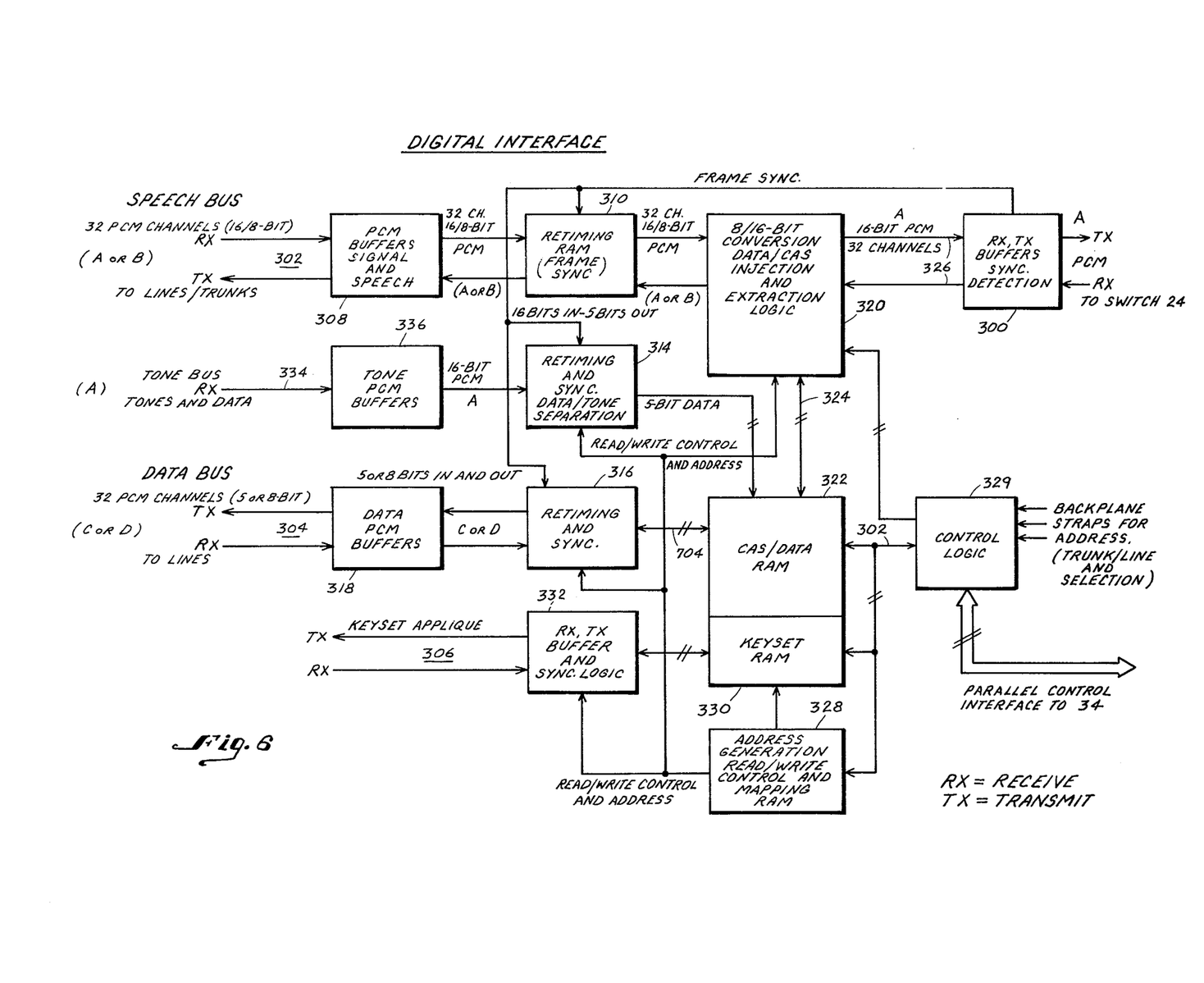
FIG. 6 is a block diagram of a digital interface in accordance with the present invention.

Referring now to FIG. 6, the digital interface circuit 22 is illustrated. Frames of PCM channels of speech and data in format A of FIG. 5 are transmitted to and received from the swtching network 24 on Tx and Rx lines, which are coupled to a synchronization detector and buffer 300. The PCM input from switcing network 24 is used to resynchronize akll the other inputs to the digital interface 22. Thus, insertion and removal of data is done in synchronization with the frame and channel sync received from the digtal switching network 24. There is thus a fixed timing relationship between the input from switching network 24, the digital interface 22 operation, and transmission via lines/trunks to users via the transmission interface 20 to lines 302 (the speech bus), lines 304 (the data bus), and lines 306 (for keyset applications). Eight-bit PCM in A or B data format from user terminals speech bus 302 is buffered by PCM buffers 308 and coupled in 32 channel A or B format to a retiming RAM 310 for retiming to the switching network data framing sync, which is coupled from buffer 300 by line 312 to retiming RAM 310, retiming RAM and data/tone separation circuit 314, and retiming RAM 316.

The retiming RAM's are memories into which information is written in frame sync with received data from the lines and is accessed and read out in sync with the internal digiral interface timing. Each retiming RAM has an address counter (not shown) which is incremented each channel time-channel N, N+1, N2 . . . so that serial 8-bit bytes are written into subsequent locations in memory. The address counter coutns to thirty-two, then starts again at the same frequency, but at a different phase. For addresses at a 2.048 M bit/s serial 8-bit data bit rate, the counter counts at a 256K bit/s counting rate. Logic is also provided (not shown) to initialize and synchronize the address couner to the A or B frame timing.

Figure 7:
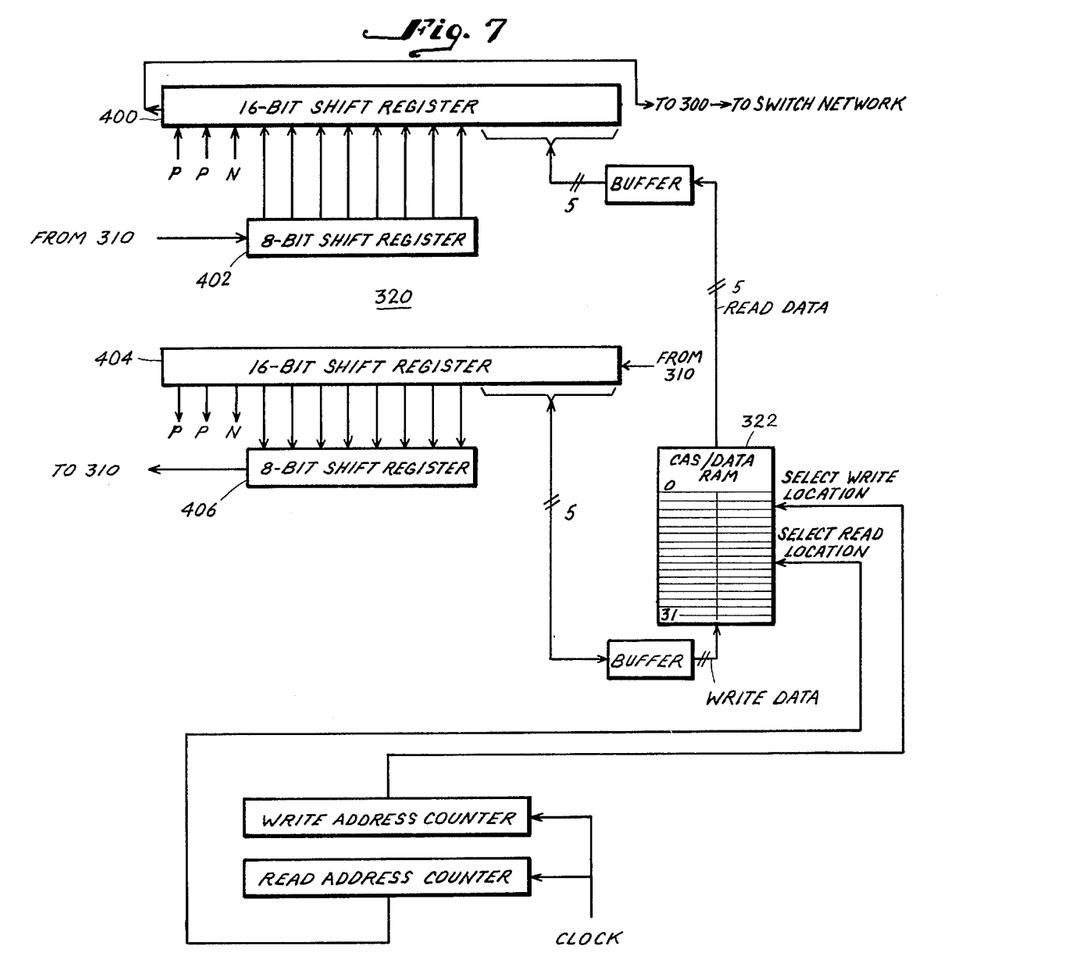
FIG. 7 is a shift register configuration useful in converting data words of one bit length to data words of another bit length.

Eight-bit PCM speech is inserted in a 16-bit field to form the switching transmission format. This is accomplished by an 8-to-16 bit conversion in 8/16 bit conversion circuit 320, which is shown in FIG. 7. When channel associated signalling (CAS) or data is to be mapped into the 16-bit channel, it is read from the CAS/DATA RAM 322 and inserted into the PCM word stream in addition to the speech field. When Channel Associated Signalling is used, it is inserted/removed from the speech field. The 16-bits are transmitted to the switching network 24 via line 324, 8/16 bit conversion circuit 320 and lines 326 in 16-bit format/channel. The CAS part of the CAS/DATA RAM 322 has a memroy map 8-bits wide and 128 locations, each of 8-bits (one per channel). The data part of the CAS/DATA RAM is 128 locations each of 4-bits. Operation of the CAS part of the RAM is described later. DATA is read out of the Data part of the CAS/DATA RAM 322 one-half word at a time (plus an indicator bit) added as it is read, as specified by an address counter (not shown) associated with RAM 322 and which receives its input from address generation read/write control 328. The address counter for RAM 322 cycles around through each channel. The memory map is accessed and data is read and inserted into memory. The memory map 328 receives and stores a data pattern from control logic 34 that when reread locally in 328 enables data reads/writes to the DATA RAM on a per channel basis from the various sources. A keyset RAM 330 is structured similarly to CAS/DATA RAM 322, and contains 2 to 2N memory word locations (assuming separate transmit-Tx and receive-Rx locations), depending upon the number of channels (N) of data it is desired to send to a keyset. Keyset sync and buffer 332 is provided with read/write control from RAM 328, as are retiming circuits 314 and 316 and 8/16 bit conversion circuit 320. Data to be sent/received from the keyset is written to or read from the keyset RAM by the control logic 34 via the local control logic 329 on the parallel control interface. The control logic 34 can similarly read/write to the CAS RAM 322 for the transfer of information.

Data in C or D format is coupled from the data bus 304 via data PCM buffer 318 to the retiming RAM 316. Data is received on data bus 304 in sequential channels in which data in 5-bit or 8-bit fields is embedded at an effective bit transfer rate of 32K bit per second per channel. When the data fields received on bus 304 are 8-bits long, they are converted to 5-bit fields, which include a "nibble" bit. When the data fields are 5-bits long, they include the nibble bit already. The data is retimed to the switch frame sync at 316 and written into CAS/DATA RAM 322 as 4-bit fields, the nibble bit defining an odd or even address in the RAM.

Heretofore, transmission to the switching network and dat ainsertion has been described, including simultaneous transmission of data written during the piror 31 channel times.

Transmission from the switching network 24 to the lines and data extraction will now be described. Data is received from the switching network 24 at sync detector 300 in 16-bit format, and sync is extracted. Eight-bit speech is extracted at 8/16 bit conversion circuit 320 and written into the retiming RAM 310 or is coupled directly to PCM buffer 308. If Channel Associated Signalling or data is mapped to the particular channel, the DATA/CAS field is extracted at 320 and written into CAS/DATA RAM 322. If data is mapped to the tone bus 334, for receipt at tone port 336, the tone bus data field is extracted at retiming, sync and data/tone separation circuit 338 and is written into the CAS/DATA RAM 322 under control of the address generation and read/write control 328. Data is transmitted simultaneously, i.e. within the next 31 channel times, simultaneously transmitted data are read from the CAS/DATA RAM 322 in a 4-bit field and are either combined to an 8-bit field or left as 5-bits, (4-bits plus the odd/even address nibble indicator bit) are retimed to the output PCM bit stream at 316 and transmitted on line 308 (and other lines at other digital interfaces 22 of identical configuration as that of FIG. 6). As already specified, the timing of the switching network 24 PCM information can be asynchronous in phase to all other data—which is a characteristic of the swtiching network 24, as described in the aforementioned U.S. Pat. No. 4,201,891 of A. Lawrence et al. The CAS/DATA insertion, extraction and PCM retiming for all PCM digitized speech and data and tones from trunks and lines are synchronized to the PCM information received from switching network 24.

The control logic 329, which includes backplane inputs and address straps inputs for line/trunk selection, and an interface to a microcomputer, the control 34 of FIG. 1, such as an Intel 8086, is of conventional circuitry and provides standard means for interfacing to the microcomputer. Thus, the control logic 329 provides a path for control words from the microcomputer to set and reset words in the mapping RAM 328 to govern data flow, which effectively permits the microcomputer to read/write to the CAS/DATA RAM 322 and to the keyset RAM 330. As a standard interface between the microcomputer and the rest of the digital interface 22, the control logic 329 includes conventional register buffers, decoders, address generation and recognition registers and initialization control.

Referring now to FIG. 7, the 8/16 bit conversion circuit 320 as coupled to CAS/DATA RAM 322 is illustrated in simplified manner. The circuit provides 8/16 bit conversion, injection and extraction of data/CAS. The circuit 320 is comprised of serial-to-parallel 16-bit and 8-bit shift registers 400, 402, 404 and 406 which provide a serial data in to parallel data out, and parallel data in to serial data out as illustrated. Counters cycle through each of channels 0–31 to insure that data is clocked through the registers in the corret channel. The protocol and NACK bits are fixed.

Figure 8:
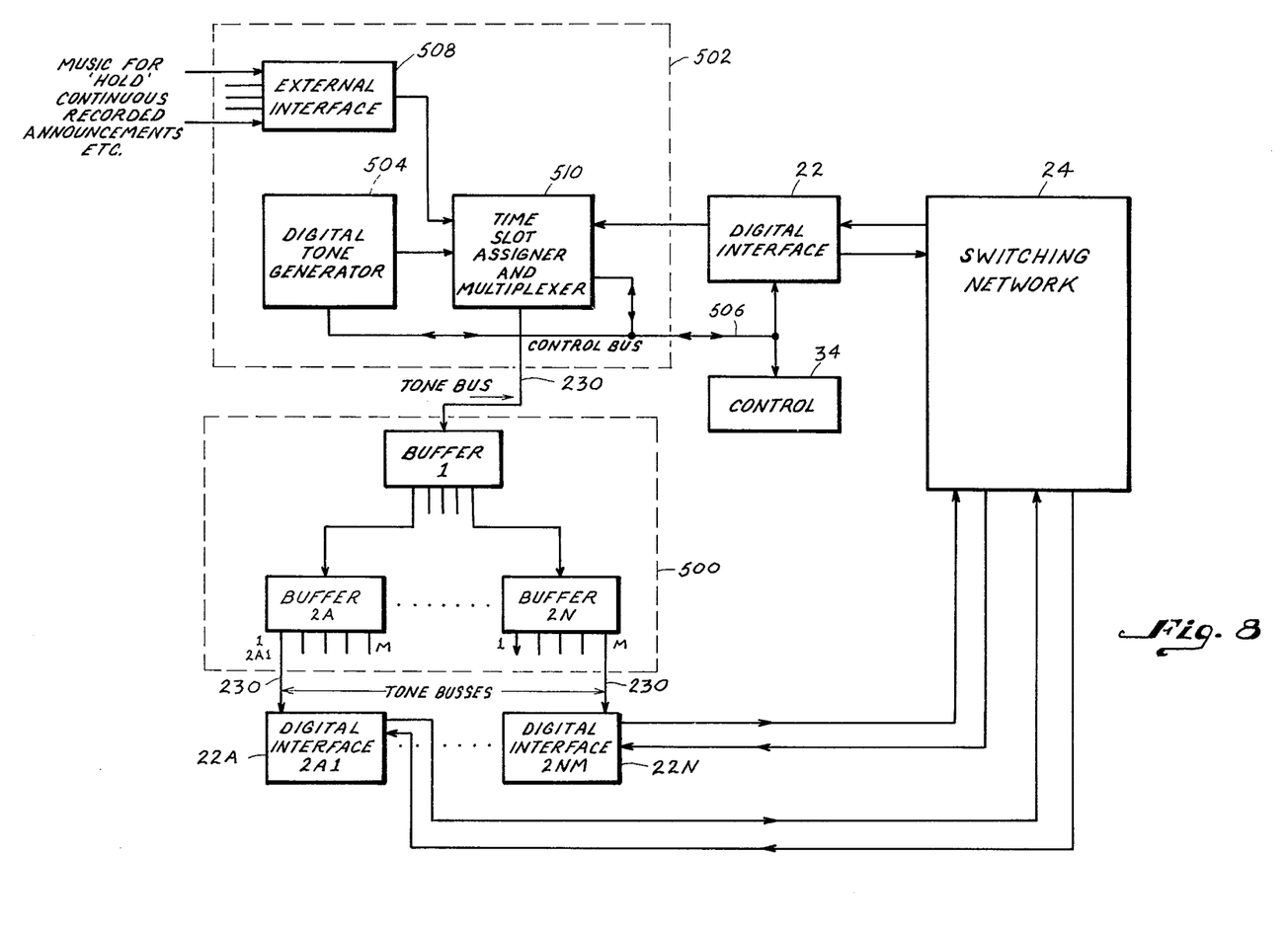
FIG. 8 is a tone bus configuration suitable for use in the present invention.

FIG. 8 illustrates the tone bus circuitry and distribution from its generation through a heirarchy of buffers to a plurality of digital interfaces. The tone bus 230 is a phase asynchronous 32-channel 16-bit PCM digital stream as in the swtich network 24. The tone bus is distributed via a heirarchy of buffers 500 to a plurality of digital interfaces shown as 22, 22A . . . 22N, coupled to the switching network 24 or other required destinations. Digital Interfaces 22A and 22N are illustrative of many digital interfaces having tone busses distributed via buffers 1, 2A, . . . 2N, i.e. tone busses 230, two of which are shown as 2AL and 2NM.

The tone circuit 502 consists of a digital tone generator 504 that produces digital PCM sequences at 8KH$_z$ per 8-bit sample for various tones used by the exchange (or PABX). These tones may be programmable in the frequency, amplitude, harmonic content and other parameters by means of the control 34 which couples instructions to the tone generator 504 on the control bus 506.

An external interface 508 converts or receives external sources such as music, continuous announcements, etc. and encodes these to 8-KH$_z$, 8-bit PCM streams. A time slot assigner 510 receives 32-channel 16-bit PCM from the digital interface 22 under contrl from the control 34 and inserts the 8-KH$_z$ 8-bit PCM samples from digital tone generator 504 and the external interface 508 into assigned channels of the PCM frame in the speech field. The digital interface 22 receives the 5-bit data field as described in PCM data from the switch network 24 and passes this data on to the time slot assigner 510 to multiplex with the other 8-bit 8KH$_z$ inputs, to form the 6-bit PCM words on the tone bus 230.

Figure 9:
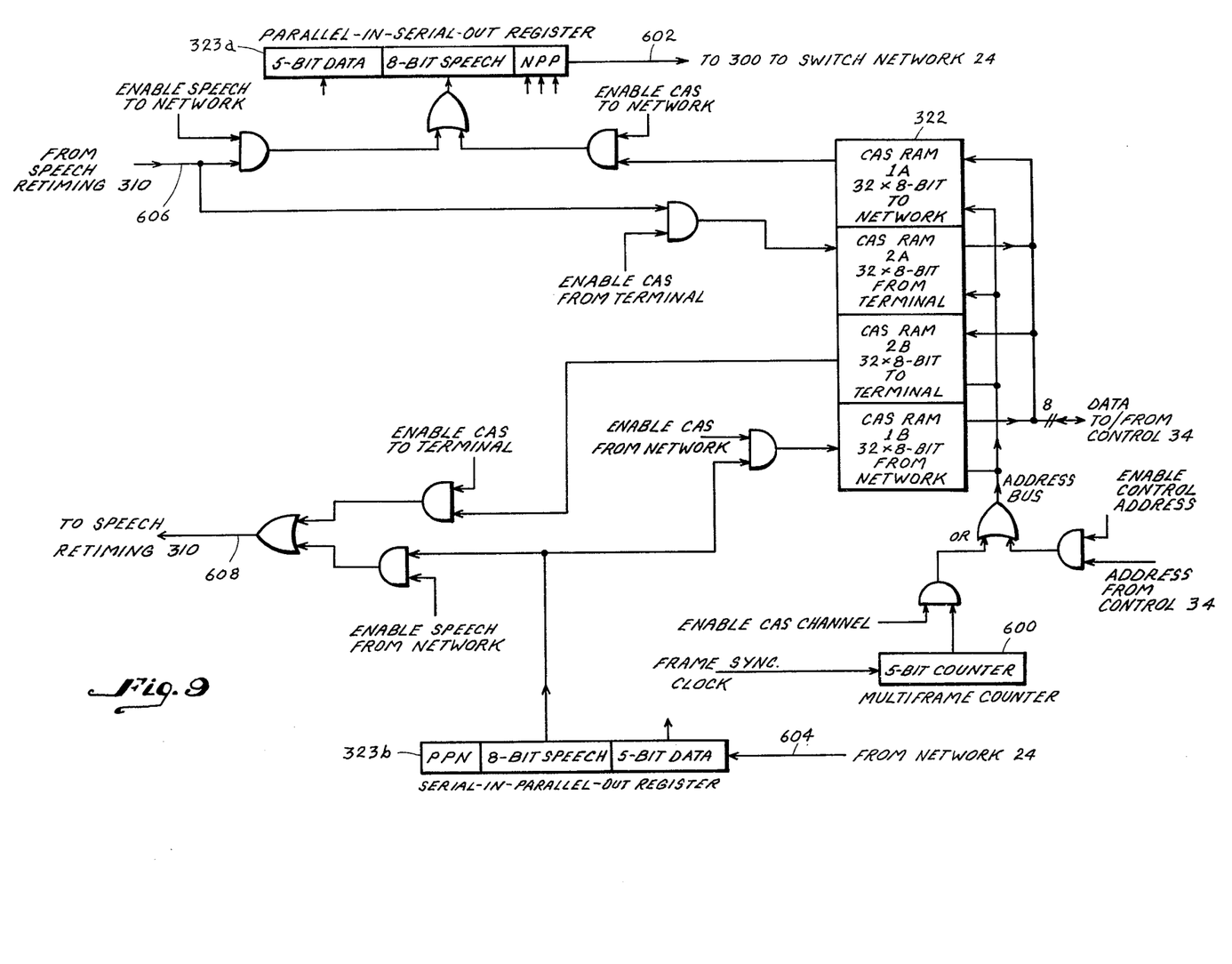
FIG. 9 illustrates data flow for Channel Associated Signalling (CAS) in the speech path between CAS/DATA RAM and serial-to-parallel data conversion circuitry.

Referring now to FIG. 9, data from Channel Associated Signalling (CAS) in the speech path between CAS/DATA RAM 322 and serial-to-parallel conversion circuit 320 is shown. Parallel-in-serial-out register 323a and serial-in-parallel-out register 323b correspond to register 400 and 404 respectively of FIG. 7.

CAS is data inserted in subsequent frames of the PCM stream in one channel, inband, forming a repetitive sequence known in telephony as a multiframe. When the appropriate channel is transmitted from or received into the digital interface 22, the content of the speech field is loaded from or to the CAS RAM 322. The control 34 can then write or read the CAS RAM 322 to send or receive control or signalling information. CAS capability both into the switch network 24 or to the terminal is provided. The use of the same channel as the CAS channel is used for signalling into the network or twoards the terminal.

A counter 600, 5-bits for example, is incremented each frame by the frame clock to create a multiframe data sequence of 32-frames, providing for receipt and transmission of $8 \times 32 = 256$ bits of signalling in each direction on lines 602, 604, 606 and 608. Transparent speech transfer is enabled on other channels when the CAS channel is not received or transmitted. Channel mapping, if required, is described herein elsewhere.

The CAS RAM 322 comprises four sections, each for example, of 32-locations of 8-bits. The four sections of CAS RAM 322 are: 1A, which serves as a buffer for data from control 34 to network 24; 1B, which serves as a buffer for data from network 24 to control 34; 2A which serves as a buffer for data from a subscriber terminal via line 606 to control 34; and 2B, which serves as a buffer for data from control 34 to a subscriber terminal via line 608.

Figure 10:
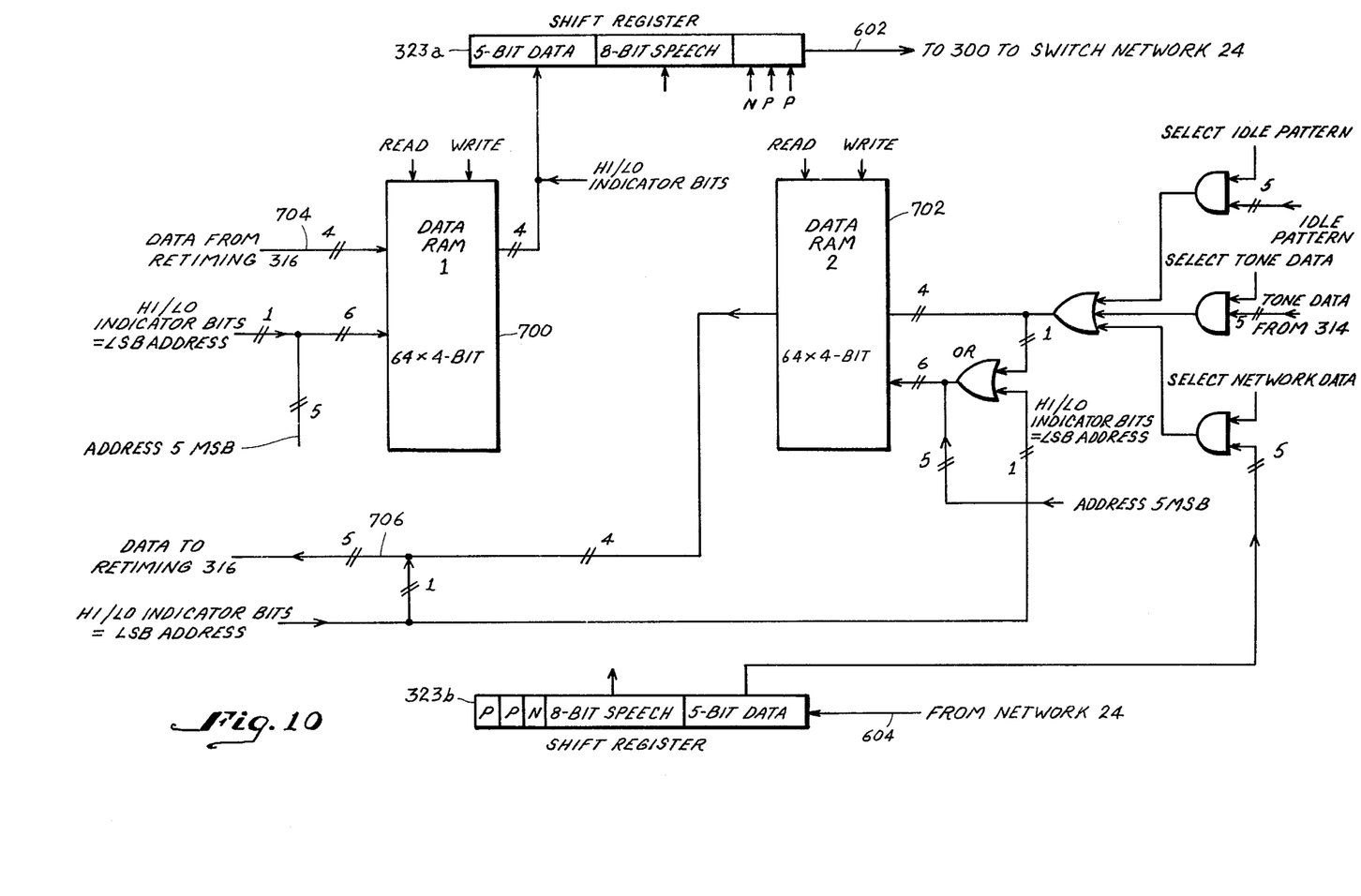
FIG. 10 illustrates nibble data insertion and extraction between CAS/DATA RAM and serial-to-parallel conversion circuitry.

Referring now to FIG. 10, nibble data insertion and extraction between CAS/DATA RAM 322 and serial-to-parallel conversion circuitry 323 is described.

Data, originally 8-bits, is held in two $64 \times 4$-bit RAMs 700 and 702, wherein each contiguous pair of locations within the RAMs contains both nibbles of the 8-bit byte, and such that the least significant bit (LSB) of address which distinguishes the adjacent locations serves as the HI/LO nibble inicator.

The data RAM portion of the CAS/DATA RAM 322 can be considered as two identical sized sections. DATA RAM 1, shown at 700, is used for buffer and channel mapping from terminal to network. DATA RAM 2, shown at 702, is used for buffer and channel mapping between data sources and a terminal or terminals.

The DATA RAM 700 has as its address for reading, the data output channel mapped to the PCM channel that is about to be transmitted to the network. The DATA RAM 700 content at this address is loaded to the shift register 323a prior to shifting the PCM channel to the network 24.

The DATA RAM 700 has as its address for writing, the number of the channel of the data received from the terminal. Thus at the network PCM channel to be sent, the data is fetched from the mapped location in RAM 700 by the data channel address fetched from the mapping RAM 800, described with reference to FIG. 11.

Figure 11:
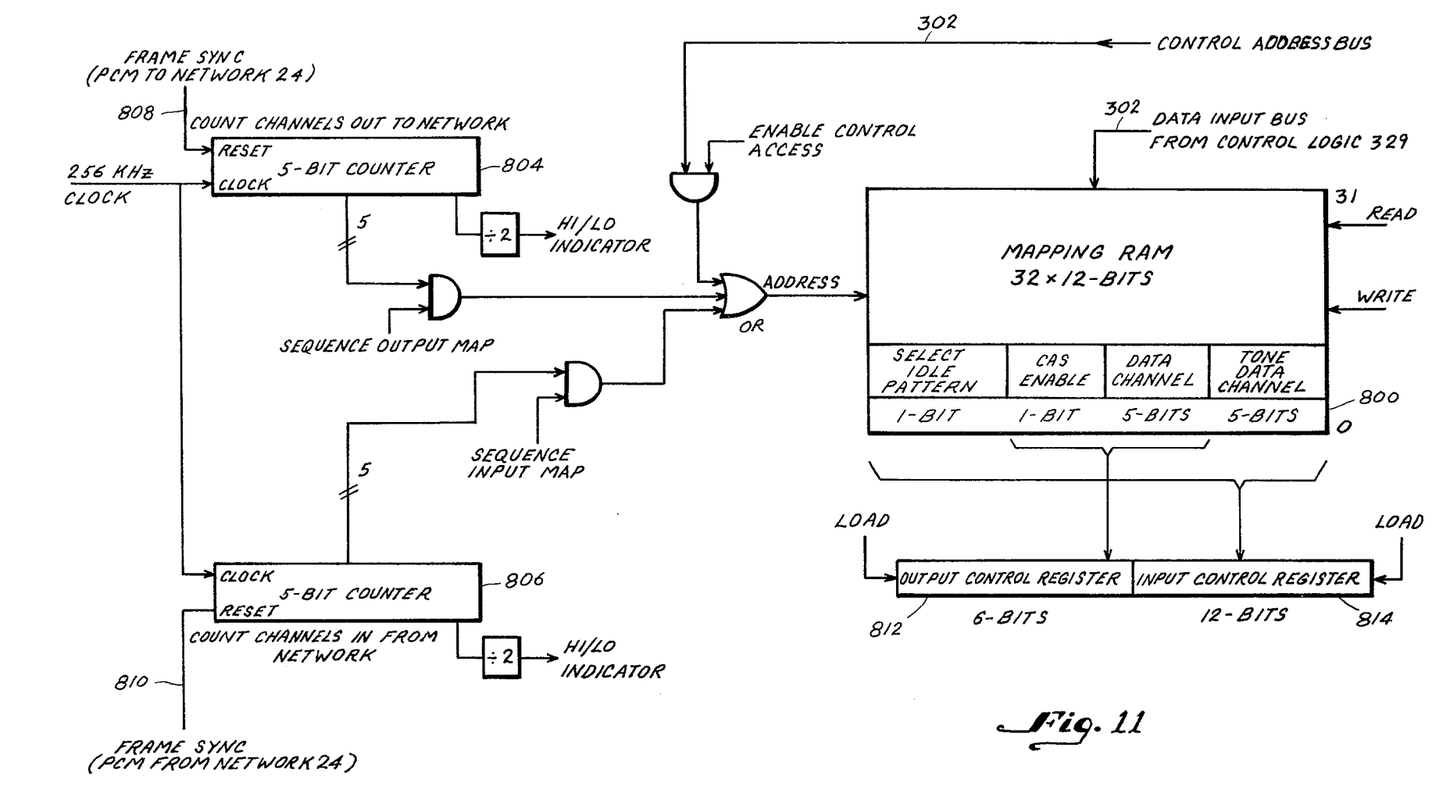
FIG. 11 is a CAS/DATA RAM control suitable for use in address generation and mapping read/write control for data transfer in and out of the CAS/DATA RAM.

DATA RAM 702 has as its address for reading, the count of the channel of the data being sent to a subscriber terminal. The address for writing of DATA RAM 702 is the data input channel number fetched from the mapping RAM 800 by access of the location in the mapping RAM 800 addressed by the channel count of the received PCM from the network 24. Thus, data is mapped to the network channel on line 602 from the data channel on line 704 and from the network channel on line 604 to the data channel on line 706.

There are two other sources of data to be written into the DATA RAM 702, which are selected as a result of the mapping RAM 800 content. These other sources of data are tone data, or an idle pattern, which is used when neither network nor tone data are connected to the data terminal.

The high/low nibble indicator is used as the LSB of address for writes and reads to the RAMs 700 and 702.

Referring now to FIG. 11, a CAS/DATA RAM control 328 is described. The mapping RAM 800 consists of 32-locations by 12-bits and is accessed twice per channel time, once for the channel sent to the network 24 and once for the channel received from the network 24. Each direction has its own address counter 804 and 806 which is reset at each appropriate frame sync time coupled to counter 804 and 806 on lines 808 and 810 respectively. As a result of each read access to the mapping RAM 800, the data read is stored in buffer registers 812 and 814, one each for output and input directions of PCM flow.

The mapping RAM 800 has read and write access also from the control 34, via control logic 329, which writes the mapping patterns into the RAM 800, an can read them for test purposes. The RAM 800 is wider than 8-bits and may thus have to be addressed in two modes, by 12-bit width (32 locations) for channel mapping and a smaller control dta width, e.g. by 8-bit width (64 locations, 32 half used) for access by control 34.

The 12-bit data width of the RAM 800 is preferably assigned as follows:
one bit—select IDLE pattern to RAM 702
one bit—select CAS channel
5-bits—mapped data channel
5-bits—mapped tone channel.

If the speech bus 302 is to have a channel mapping to the switch network PCM in the digital interface 22, this can be effected by a similar technique as has been described with reference to FIGS. 9, 10 and 11, and by extension of the mapping RAM 800 width to include a field of speech bus channel number.

When a channel of the network PCM is about to be transmitted to the switching network on line 602, that channel number as tracked by the counter 804 is addressed to read the mapping RAM 800, loading the read data from the RAM 800 to the output control register 812.

The control word in register 812 contains a CAS enable bit. If this is set, the speech field in the shift register 323a is loaded frm the CAS RAM 1A (322), accessed from the multiframe address reached by the multiframe counter 600. CAS is also loaded into CAS RAM 2A (322) from the terminal 8-bit speech field in line 606 at the multiframe count address. The data field in DATA RAM 700 is loaded into the shift register 323a from the DATA RAM 700 address specified by the mapping RAM 800 data channel number previously loaded to the output control register 812.

When a channel of the network PCM is received on line 604 to shift register 323b, that channel number as tracked by the counter 806 is used as address to read the mapping RAM 800, loading the addressed content to the input control register 814. If the CAS enable bit is set, CAS is loaded to CAS RAM 1B (322) from the received speech field in shift register 323b, and CAS is also sent to the terminal from CAS RAM 2B (322) in the speech field on line 608. CAS RAM addresses are determined by the multiframe counter 600. The DATA RAM 702 is loaded from the 5-bit field in the received network PCM in shift register 323b if the tone data channel mapping address in input control register 814 is zero and the select idle pattern bit in register 814 is not set.

If the tone data channel field in inut control register 814 is non-zero, then the tone data is read from a location addressed by that field in a RAM located in the retiming and sync, data and tone separation circuit 314 referenced by FIG. 6, and loaded to the DATA RAM 702 in the location in RAM 702 addressed by the "data channel" field previously loaded to the input control register 814. If the select idle pattern bit is set, an idle pattern is put into the mapped location in the DATA RAM 702. This overrides the tone data channel field content implications present in register 814.

The read/write control and address mapping 328 also contains sequencers that control the various read and write accesses in fixed time slots synchronized to the network PCM framing, channel timing and 4.096 MH$_3$ clocks.

While the present invention has been described in connection with preferred embodiments thereof, it is to be understood that additional embodiments, modifications and applications which will become obvious to those skilled in the art are included within the spirit and scope of the invention as set forth by the claims appended hereto. For example, many modes of data transmission can be achieved with the present invention, using various known transmission interfaces. These include single termination to single termination, data only or data and voice concurrently. For data only, data could be at 64K-bits full duplex in the speech field or data could be transmitted at speech bandwidths by use of modems and transmitted in the speech field. For data and speech concurrently, data could be transmitted at 32K-bits and speech at 64K-bits full duplex by use of 5 spare bits in SPATA format; or if 32K-bit speech is coded and accepted, then 5 and 8 bit fields can be reversed such that 64K-bit data can be sent full duplex. For multiple terminations (greater than or equal to two) with or without common data base access, data can be transmitted in a conference mode with the following variations: the conference circuitry extracts data and performs store-and-forward, routing/switching or access/manipulation of a common database such that common dta is returned to all terminations or switching of messages is performed between terminations. Full duplex paths are established between each termintion and the conference circuit. For multiple terminations configured in a nonconference mode (with or without common database access), data can be transmitted between two terminations having direct voice connection, and data connection via a common database such that each termination receives the same returned data from the database or alternately so that each termination broadcasts (by use of a broadcast facility) the 16-bit channel with speech and data combined to both the other termination and the common data base, and common data is returned via the tone bus which permits broadcast access on 30 channels to all terminals. Two terminations having direct voice connection and data connection via boradcast can be connected to one or more data bases, such that each terminal receives different returned data.

We claim:

1. A circuit for combining and splitting speech and data for transmission through a digital switching network between two or more terminal sources, comprising:
   means for receiving and retiming frames of digitally encoded multibit words in a plurality of channels from said terminal sources, some of which bits of said multibit words comprise a digital speech sample;
   means for receiving and retiming frames of N bit data words in a plurality of channels from said terminal sources;
   means for deriving two or more nibble data words from each of said N bit data words, each of said nibble data words having less than N bits of said N bit data word therein;
   means for inserting said desired nibble data words into said digitally encoded multibit words such that said digital speech sample and one of said nibble data words are each inserted within each of said digitally encoded multibit words in a designated channel of said frame, and the other of said nibble data words are inserted in the following frames in multibit digital words in the same channel as the next digital speech samples; and
   means for transmitting said frames of channels containing said multibit digital words containing said digital speech samples and said nibble data words to said digital switching network.

2. A circuit in accordance with claim 1 wherein two nibble data words are derived from each N bit data word and wherein said nibble data words are inserted into immediately adjacent data frames such that a plurality of N bit data words are each converted into two nibble data words, one of which is inserted into bit positions in said digitally encoded multibit words together with said digital speech samples in odd frames and the other of which nibble data words is inserted in even frames.

3. A circuit in accordance with claim 2 wherein said multibit words in said plurality of channels are 16-bit PCM words including an 8-bit speech sample, a plurality of protocol bits and at least a 5-bit information field for use as a data field.

4. A circuit in accordance with claim 3 wherein N equals eight in said N-bit data words, and wherein one of said nibble data words is 5-bits long, and includes 4-bits of said 8-bit data word plus a first nibble indicator, and wherein the other nibble data word is also 5-bits long, and includes the other 4-bits of said 8-bit data word, plus a second nibble indicator, said first and second nibble indicators being of different digital significance, and wherein said first and second nibble data words are alternately inserted into the stream of 16-bit PCM words for use as a data field, such that said stream of 16-bit PCM words have a combined speech and data field.

5. A circuit in accordance with claim 1 wherein each of said channels in each of said transmitted frames includes all of the nibble data words and digital speech samples inserted during the prior plurality of channel times of each frame and wherein said plurality corresponds to the number of channels per frame.

6. A circuit for combining and splitting speech and data for bidirectional transmission through a digital switching network between two or more terminal sources comprising:
   means for receiving and retiming frames of digitally encoded multibit words in a plurality of channels coupled from said digital switching network, said multibit words including a speech field containing a digital speech sample and a data field containing an N-bit data word;

means for extracting said digital speech sample from said speech field;

means for extracting said N-bit data word from said data field;

means for transmitting said digital speech samples in designated channels within said frames to said terminal sources; and means for combining at least two of said extracted N-bit data words into a data field of 2N-bits and transmitting said 2-N-bit data words in designated channels to said terminal sources.

7. A circuit in accordance with claim 6 wherein said N-bit data words are each a nibble of a 2N-bit data word, said nibbles each being inserted into the stream of said multibit words in odd and even frames of channels of said multibit words.

8. A circuit in accordance with claim 7 wherein said multibit words in said channels are 16 bit PCM words including a 8-bit speech sample, a plurality of protocol bits and at least 5-bits for use as said data field.

9. A circuit in accordance with claim 8 wherein 2N equals eight in said 2N-bit data words, and wherein one of said nibble data words is 5-bits long, and includes 4-bits of said 8-bit data word plus a first nibble indicator, and wherein the other nibble data word is also 5-bits long, and includes the other 4-bits of said 8-bit data word, plus a second nibble indicator, said first and second nibble indicators being of different digital significance, and wherein said first and second nibble data words are alternately inserted into the stream of 16-bit PCM words for use as a data field, such that said 16-bit PCM words have a combined speech and data field.

10. A circuit in accordance with claim 2 wherein said means for deriving two nibble data words includes serial-to-parallel shift register means for extracting said nibble data words from said N-bit data words and random access memory means coupled to said shift register means for storing said nibble words; and address generation means for selectively mapping said stored nibble data words into designated channels.

11. A circuit in accordance with claim 10 further comprising:

a tone bus coupled to each of said terminals sources;

means for receiving and retiming tone data words on said tone bus; and means for storing tone data words from said bus in said random access memory means such that said stored tone data words can be extracted from said random access memory as a data field and coupled to said data bus.

12. A circuit in accordance with claim 11 wherein said address generation means is adapted to map said tone bus data to said data bus selectively for transmission to one or more of said terminal sources.

13. A combined telecommunications and data communications system for combining and splitting speech and data for transmission through a digital switching network between one or more ports and a database system, comprising:

digital interface means coupled to said ports for combining frames of channels of digitally encoded speech and data words from speech and data busses respectively from said ports in the same channels for bidirectional transmission between said ports;

digital switching network means coupled to said digital interface means for switching and transmitting said combined frames of digitally encoded speech and data simultaneously in the same channels between said ports and said database system;

means associated with said digital interface means at each port for inserting and extracting said digitally encoded speech and data words such that said speech words are coupled to the speech bus and said data words are coupled to the data bus at each port;

a tone bus coupled to said ports for providing data and tone distribution thereto; and digital interface means associated with said database system for selectively accessing digital data words stored therein and coupling said accessed digital data words to said tone bus whereby said accessed digital data words are selectively coupled to the data bus at said ports from said tone bus.

14. A system in accordance with claim 13, further including conference and broadcast means for simultaneously transmitting the accessed data from said database system to a plurality of ports.

15. A system in accordance with claim 14, wherein said tone bus comprises a multichannel time division multiplexed (TDM) PCM transmission link whereby different ports may simultaneously receive different accessed data from said database system through insertion of said accessed data into different channels of the TDM PCM data frame.

16. A system in accordance with claim 13 wherein at least some of said ports include a telephone subscriber set coupled to said speech bus and a data terminal coupled to said data bus.

17. A method for combining and splitting speech and data for transmission through a digital switching network between two or more terminal sources, comprising the steps of:

receiving and retiming frames of digitally encoded multibit words in a plurality of channels from said terminal sources, some of which bits of said multibit words comprise a digital speech sample;

receiving and retiming frames of N bit data words in a plurality of channels from said terminal sources;

deriving two or more nibble data words from each of said N bit data words, each of said nibble data words having less than N bits of said N bit data word therein;

selectively inserting or extracting said derived nibble data words into said digitally encoded multibit words such that said digital speech sample and one of said nibble data words are each inserted within said digitally encoded multibit words in a designated channel of said frame, and the other of said nibble data words are inserted in the following frames in the same channel in subsequent multibit digital words together with as next digital speech sample; and transmitting frames of channels containing said multibit digital words containing said speech samples and data words to said digital switching network.

18. A method in accordance with claim 17 where the number of derived nibble data words is two and wherein said nibble data words are inserted into immediately adjacent data frames such that a plurality of N bit data words in a bit stream are each converted into two nibble data words, one of which nibble data words is inserted into the digitally encoded multibit words in odd frames and the other of which nibble data words is inserted into said multibit words in even frames in said bit stream.

19. A method for combining and splitting speech and data for transmission through a digital switching network in a telecommunications system between one or more ports and a database system, comprising the steps of:
 combining frames of channels of digitally encoded speech and data into multibit words having an information field including a speech field and a data field, said speech and data being obtained from speech and data busses from said ports in the same channels for bidirectional transmission between said ports;
 simultaneously switching and transmitting said combined frames of digitally encoded speech and data in the same channels between said ports and said database system;
 inserting and extracting said speech and data from said multibit words such that said speech is coupled to a designated speech bus and said data is coupled to a designated data bus at each port;
 providing a tone bus for coupling data and tone distribution to said ports; and
 selectively accessing data stored in said database system and coupling said accessed data to said tone bus whereby said accessed data is selectively coupled to the data busses at said ports.

20. A method in accordance with claim 19, further including the step of simultaneously transmitting accessed data from said database system on said tone bus to a plurality of said ports.

21. A method in accordance with claim 20, wherein different ports simultaneously receive different accessed data from said database system through insertion of said data into different designated channels of the tone bus.

22. A system in accordance with claim 19 further including the step of coupling said speech bus and said data bus to a telephone subset and to a data terminal respectively at said ports.

23. A PABX for providing bidirectional communication of speech and data between two or more subscribers, comprising:
 means for receiving and retiming frames of digitally encoded multibit words in a plurality of channels from said subscribers, some of which bits of said multibit words comprise a digital speech sample;
 means for receiving and retiming frames of N bit data words in a plurality of channels from said subscribers;
 means for deriving two or more nibble data words from each of said N bit data words, each of said nibble data words having less than N bits of said N bit data word therein;
 means for inserting said desired nibble data words into said digitally encoded multibit words such that said digital speech sample and one of said nibble data words are each inserted within each of said digitally encoded multibit words in a designated channel of said frame, and the other of said nibble data words are inserted in the following frames in multibit digital words in the same channel as the next digital speech samples;
 a digital switching network for selectively interconnecting said subscribers over transmission paths through said network; and
 means for coupling said frames of channels containing said multibit digital words containing said digital speech samples and said nibble data words to said digital switching network.

24. A PABX in accordance with claim 23 wherein two nibble data words are derived from each N bit data word and wherein said nibble data words are inserted into immediately adjacent data frames such that a plurality of N bit data words are each converted into two nibble data words, one of which is inserted into bit positions in said digitally encoded multibit words together with said digital speech samples in odd frames and the other of which nibble data words is inserted in even frames.

25. A PABX in accordance with claim 24 wherein said multibit words in said plurality of channels are 16-bit PCM words including an 8-bit speech sample, a plurality of protocol bits and at least a 5-bit information field for use as a data field.

26. A PABX in accordance with claim 25 wherein N equals eight in said N-bit data words, and wherein one of said nibble data words in 5-bits long, and includes 4-bits of said 8-bit data word plus a first nibble indicator, and wherein the other nibble data word is also 5-bits long, and includes the other 4-bits of said 8-bit data word, plus a second nibble indicator, said first and second nibble indicators being of different digital significance, and wherein said first and second nibble data words are alternately inserted into the stream of 16-bit PCM words for use as a data field, such that said stream of 16-bit PCM words have a combined speech and data field.

27. A PABX in accordance with claim 23 wherein each of said channels in each of said coupled frames includes all of the nibble data words and digital speech samples inserted during the prior plurality of channel times of each frame and wherein said plurality corresponds to the number of channels per frame.

28. A PABX for providing bidirectional transmission of speech and data between two or more subscriber lines, comprising:
 a digital switching network for selectively interconnecting said subscriber lines over transmission paths through said network;
 means for receiving and retiming to the switching network frame synchronization frames of digitally encoded multibit words in a plurality of channels coupled from said digital switching network, said multibit words including a speech field containing a digital speech sample and a data field containing an N-bit data word;
 means for extracting said digital speech sample from said speech field;
 means for extracting said N-bit data word from said data field;
 means for transmitting said digital speech samples in designated channels within said frames to said subscriber lines; and
 means for combining at least two of said extracted N-bit data words into a data field of at least 2 N-bits and transmitting said 2 N-bit data words in designated channels to said subscriber lines.

29. A PABX in accordance with claim 28 wherein said N-bit data words are each a nibble of a 2N-bit data word, said nibbles each being inserted into the stream of said multibit words in odd and even frames of channels of said multibit words.

30. A PABX in accordance with claim 29 wherein said multibit words in said channels are 16-bit PCM words including an 8-bit speech sample, a plurality of protocol bits and at least 5-bits for use as said data field.

31. A PABX in accordance with claim 30 wherein 2N equals eight in said 2N-bit data words, and wherein one of said nibble data words is 5-bits long, and includes 4-bits of said 8-bit data word plus a first nibble indicator, and wherein the other nibble data word is also 5-bits long, and includes the other 4-bits of said 8-bit data word, plus a second nibble indicator, said first and second nibble indicators being of different digital significance, and wherein said first and second nibble data words are alternately inserted into the stream of 16-bit PCM words for use as a data field, such that said 16-bit PCM words have a combined speech and data field.

32. A PABX in accordance with claim 24 wherein said means for deriving two nibble data words includes serial-to-parallel shift register means for extracting said nibble data words from said N-bit data words and random access memory means coupled to said shift register means for storing said nibble words; and
   address generation means for selectively mapping said stored nibble data words into designated channels.

33. A PABX in accordance with claim 32 further comprising;
   a tone bus coupled to each of said subscriber lines;
   means for receiving and retiming tone data words on said tone bus; and
   means for storing tone data words from said tone bus in said random access memory means such that said stored tone data words can be extracted from said random access memory as a data field and coupled to said data bus.

34. A PABX in accordance with claim 33 wherein said address generation means is adapted to map said tone bus data to said data bus selectively for transmission to one or more of said subscriber lines.

35. A PABX in accordance with claim 28 further comprising:
   a database system;
   a tone bus coupled to said ports for providing telephone signalling thereto; and
   digital interface means associated with said database system for selectively accessing digital data words stored therein in response to data words from said subscriber lines and coupling said accessed digital data words to said tone bus whereby said accessed digital data words are selectively coupled to said subscriber lines.

36. A PABX in accordance with claim 35, further including conference and broadcast means for simultaneously transmitting the accessed data from said database system to a plurality of subscriber lines.

37. A PABX in accordance with claim 36, wherein said tone bus comprises a multichannel time division multiplexed (TDM) PCM transmission link whereby different subscriber lines may simultaneously receive different accessed data from said database system through insertion of said accessed data into different channels of the TDM data frame.

38. A system in accordance with claim 35 wherein at least some of said subscriber lines are each coupled to include a telephone subscriber set and a data terminal.

* * * * *